Sept. 12, 1961  E. STRANDENGEN  2,999,268
FRICTION HINGE, ESPECIALLY FOR PIVOT WINDOWS
Filed Aug. 25, 1959  2 Sheets-Sheet 1

INVENTOR
EINAR STRANDENGEN
BY
ATTORNEYS

Sept. 12, 1961   E. STRANDENGEN   2,999,268
FRICTION HINGE, ESPECIALLY FOR PIVOT WINDOWS
Filed Aug. 25, 1959   2 Sheets-Sheet 2
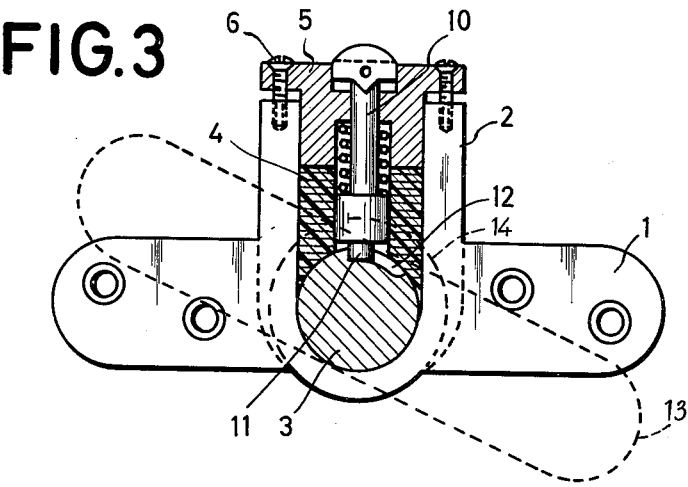
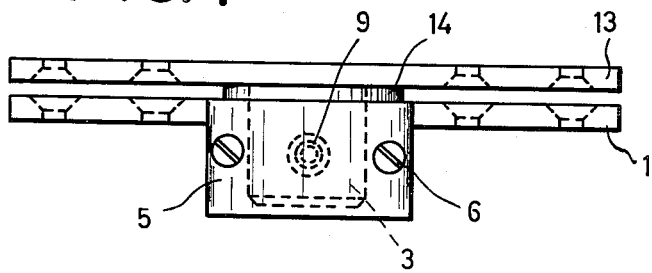
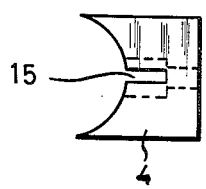
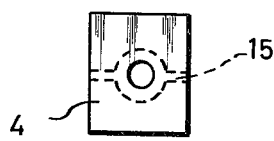
INVENTOR
EINAR STRANDENGEN
BY
ATTORNEYS

2,999,268
FRICTION HINGE, ESPECIALLY FOR PIVOT WINDOWS

Einar Strandengen, Haugenstua (Grorud), Oslo, Norway, assignor to A/S Grorud Jernvarefabrik, Grorud, Oslo, Norway
Filed Aug. 25, 1959, Ser. No. 835,944
Claims priority, application Norway Sept. 1, 1958
4 Claims. (Cl. 16—141)

The present invention relates to a friction hinge, especially for pivot windows which may be pivotally mounted about a horizontal or vertical axis extending substantially through the centre of gravity of the window. Such a hinge comprises a sash fitting and a frame fitting.

The sash fitting comprises a fastening plate which is adapted to be fitted in a wooden sash or in a recess in a metal profile. The pivot pin is secured to the fastening plate and is adjacent to the fastening plate surrounded by a spacer which determines the clearance between the sash and the frame.

The frame fitting also comprises a fastening plate adapted to be fitted in the same way as the sash fitting, and a housing adapted to accommodate the pivot pin and serve as a bearing for the latter.

The object of the invention is to provide a friction hinge of this kind, in which an exact centering of the pivot pin in the bearing is obtained and the frictional pressure is transmitted and adjusted in such a way that lost motion at all times is avoided.

Another object is to make the frame fitting in such a way that the sash frame with sash fitting mounted thereon may be easily mounted on the frame, i.e. that the pivot pin can be easily inserted into and removed from the bearing housing of the frame fitting.

According to the invention the bearing housing of the frame fitting comprises a U-shaped outwardly opening recess, the bottom of which constitutes the one bearing half of the pivot bearing, the other bearing half being formed by a friction block accommodated in the recess and adapted to apply a preferably adjustable frictional pressure on the pivot pin inserted in the bearing housing.

The said friction block which is supported and guided by the straight sides of the recess is adapted to be kept in place and pressed against the pivot pin by means of a press block which is also accommodated in the recess.

The friction block consists suitably of an elastic, frictional material and is provided with one or more slots which permit the friction block to wedge itself fast in the space between the pivot pin and the straight sides of the recess.

The above and other features of the invention will appear more in detail from the following description with reference to the drawing which illustrates different embodiments of a fitting according to the invention.

FIGS. 1–3 illustrate sections at a right angle to the pivot pin of three embodiments respectively of a hinge according to the invention.

FIG. 4 is a plan view of a hinge according to FIG. 1.

FIGS. 5 and 6 illustrate the friction block in a side view and plan view, respectively.

Figure 1:
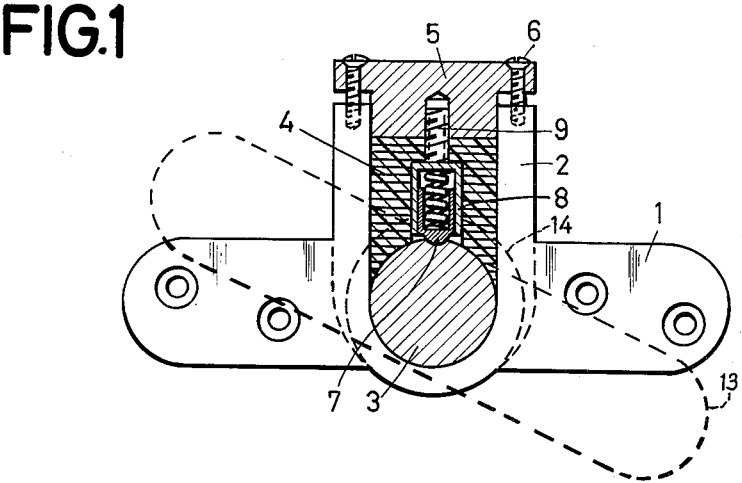

In the figures 1 designates the fastening plate of the frame fitting, and 2 the bearing housing of the frame fitting, which housing is formed with a U-shaped recess, the bottom of which constitutes the one half of the bearing in which the pivot pin 3 rests. The pivot pin 3 is cylindrical, is secured to and projects from the fastening plate 13 and is surrounded by a spacer 14 located between the plates 1 and 13, as shown in FIG. 4. In the recess of the bearing housing further a friction block 4 is accommodated, which is pressed against the pivot pin 3 by means of the press block 5 which is secured to the bearing housing by means of two screws 6 (see FIG. 4), the heads of which are countersunk in the press block. These screws also serve to adjust the frictional pressure. The adjustment of the frictional pressure may also be effected by means of a central screw. The two other screws must then be fast tightened.

The hinge is preferably made with a marked stop for airing position. As a result thereof a unitary appearance of a frontage is obtained when airing at the same time with many windows provided with friction hinges, i.e. that all windows have the same airing angle.

According to FIG. 1, such a stop is constructed so that the hinge is provided with a plunger 7 which is subjected to a permanent spring pressure and which in airing position falls into a groove in the pivot pin 3. The window may be further opened by increasing the pressure against the window, so that the spring-loaded plunger again slips out of the groove. The plunger 7 together with the spring which influences the same is mounted in a spring housing 8 which together with a screw 9 is threaded into the press block 5. The screw 9 also serves as a fastening screw for the friction block 4.

Figure 2:
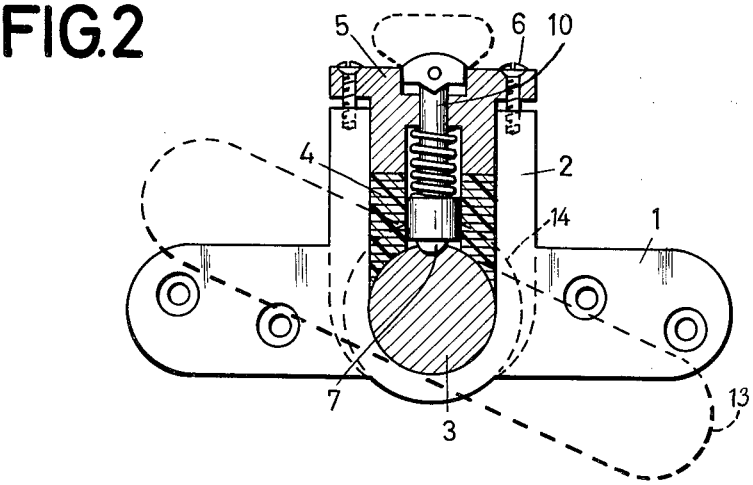

FIG. 2 illustrates an airing stop of similar kind, but the spring-loaded plunger 7 is here provided with a stem 10 for external operation. The head of the stem 10 is, as shown, on the lower surface, provided with two cams, and the recess in the press block in which the stem head is located has two lifting projections having a central arresting screw. By turning the stem 10, the stop mechanism may be disconnected and again connected for operation.

FIG. 3 illustrates a so-called safety stop. This stop has the same externally operable stem and head structure as shown in FIG. 2, but a spring-loaded stop 11 is here normally in engagement with a slot 12 milled in the pivot pin 3, so that the window under ordinary frictional resistance may be opened freely to airing position, but cannot be moved further without releasing the stop. This arrangement serves as a safety measure in order that small children shall not be able to open the window so much that they can fall out.

FIG. 4 shows the hinge assembly with the spacer 14 located between the fastening plates 1 and 13 and the pivot pin 3 projecting into the bearing housing below the press block 5.

A shown in FIGS. 5 and 6 the friction block is provided with a central slot 15 for the purpose above mentioned, namely that this slot through pressure from the press block permits the friction block to wedge itself fast against the side walls of the recess, at the same time the friction block presses against the pivot pin to give the hinge the necessary frictional resistance. As a result thereof the hinge is entirely free from lost motion, and at the same time an even and pleasant frictional resistance is obtained.

The press block and the friction block may also be made from the same material, and possibly in one piece. When the friction block has the form shown, the block will fill out the entire space in the recess between the press block and the pivot pin.

It will naturally be understood that the invention may be used everywhere where two parts shall be able to swing relative to each other opposed by friction, and also that the frame fitting and the sash fitting can be exchanged, i.e. that the sash fitting is formed as the frame fitting above described, and vice versa.

I claim:

1. A friction hinge, especially for pivot windows which are pivotally mounted about a horizontal or vertical axis which extends preferably through the centre of gravity of the window, comprising a sash fitting, a cylindrical pivot pin secured to and projecting from the sash fitting, a frame fitting provided with a bearing housing for the pivot pin, said bearing housing including means secured to the frame fitting defining a U-shaped recess the bottom of which is semi-cylindrical and constitutes one bearing half engaging the pivot pin, a second bearing half comprising a friction block which is accommodated in the recess and is provided with a semi-cylindrical surface corresponding to and engaging the surface of the pivot pin, the friction block having straight sides slidably engaging the straight sides of the U-shaped recess and being supported and guided by the straight sides of the recess, a press block accommodated in the U-shaped recess on the side of the friction block opposite the pin for pressing the friction block against the cylindrical surface of the pin, and means for securing the press block to the bearing half having the U-shaped recess and for forcing the press block against the friction block and the latter in turn into frictional engagement with the pivot pin.

2. A friction hinge as claimed in claim 1, including a spring-loaded plunger mounted in the press block and extending through the friction block into engagement with the pivot pin, the pin being provided with a groove for receiving the inner end of the plunger, whereby the sash fitting may be held at a predetermined angular position with respect to the frame fitting.

3. A friction hinge as claimed in claim 2, in which the groove in the pivot pin is a circumferential groove permitting a predetermined range of pivotal movement of the sash fitting with respect to the frame fitting.

4. A friction hinge as claimed in claim 2, in which the spring-loaded plunger includes means extending through the top of the press block, such means being provided with means for holding the plunger out of engagement with the groove in the pivot pin.

References Cited in the file of this patent

UNITED STATES PATENTS

| 1,031,287 | Page | July 2, 1912 |
| 1,074,839 | Curry | Oct. 7, 1913 |

FOREIGN PATENTS

| 360,584 | Great Britain | Nov. 12, 1931 |